(No Model.) 2 Sheets—Sheet 1.
J. SUYDAM.
AUTOMATIC PIPE COUPLING FOR RAILWAY CARS.
No. 461,778. Patented Oct. 20, 1891.
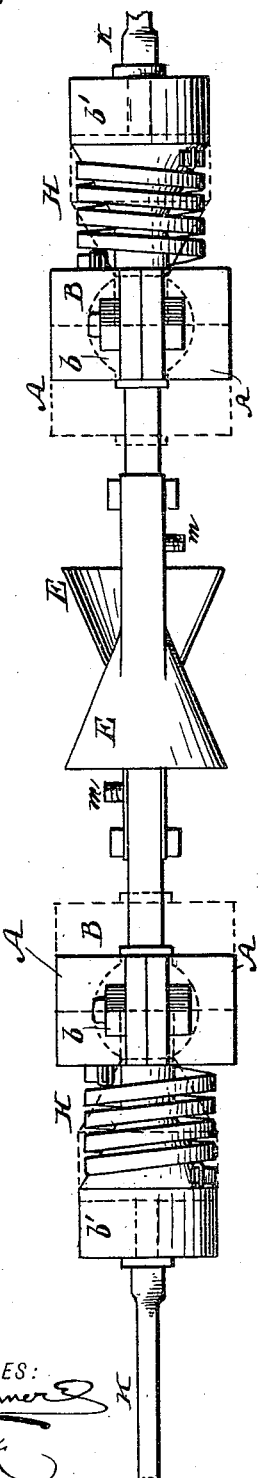
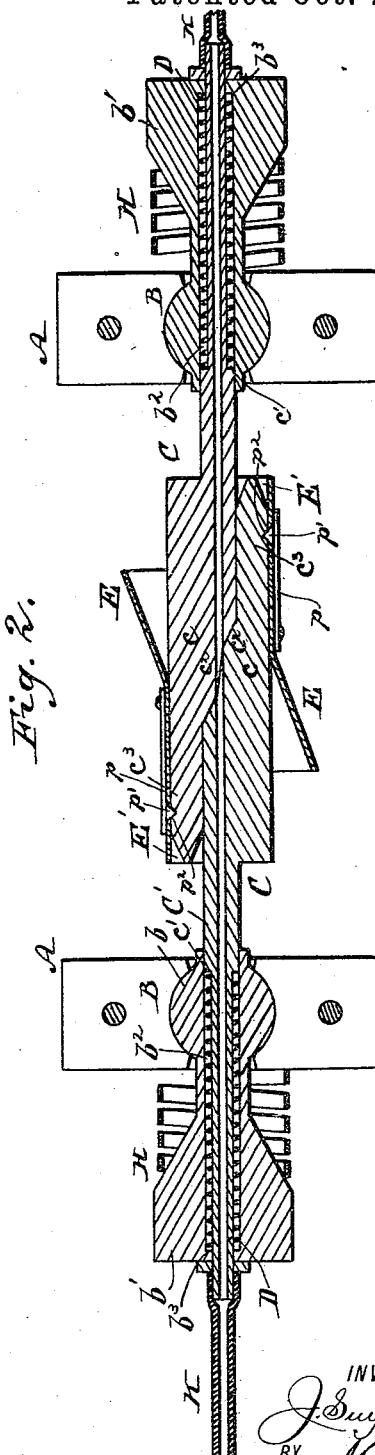
WITNESSES:
INVENTOR:
ATTORNEYS (No Model.) 2 Sheets—Sheet 2.
J. SUYDAM.
AUTOMATIC PIPE COUPLING FOR RAILWAY CARS.
No. 461,778. Patented Oct. 20, 1891.
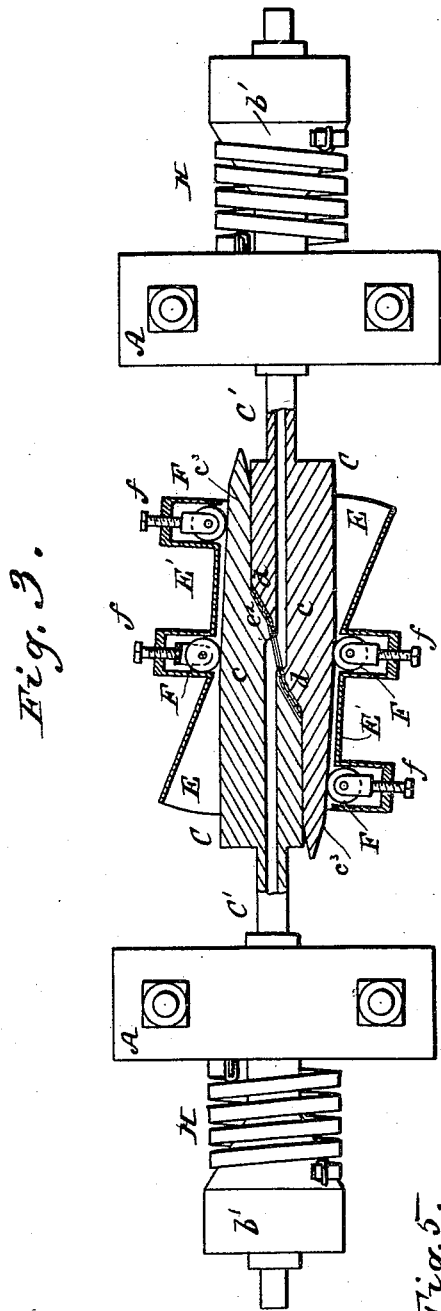
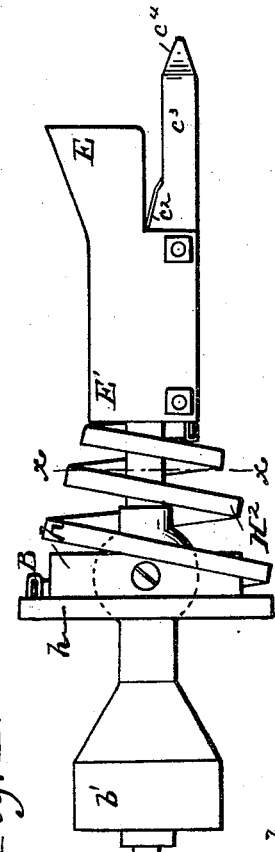
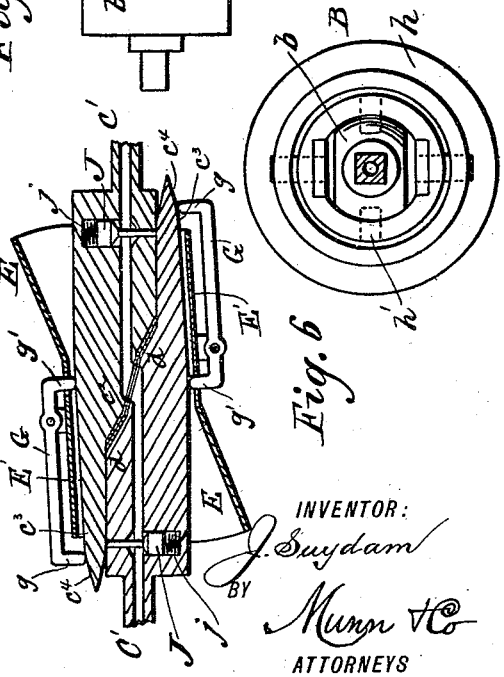
WITNESSES:
John M. Deemer
C. Sedgwick
INVENTOR:
J. Suydam
BY Munn & Co
ATTORNEYS
THE NORRIS PETERS CO., PHOTO-LITHO., WASHINGTON, D. C.

UNITED STATES PATENT OFFICE.

JOHN SUYDAM, OF SCHENECTADY, NEW YORK.

AUTOMATIC PIPE-COUPLING FOR RAILWAY-CARS.

SPECIFICATION forming part of Letters Patent No. 461,778, dated October 20, 1891.

Application filed September 5, 1890. Renewed September 29, 1891. Serial No. 407,117. (No model.)

*To all whom it may concern:*

Be it known that I, JOHN SUYDAM, of Schenectady, in the county of Schenectady and State of New York, have invented a new and Improved Automatic Pipe-Coupling for Railway-Cars, of which the following is a full, clear, and exact description.

The object of my invention is to provide an automatic coupling for steam and air pipes used on railway-cars, which will not be interfered with by the motion of the cars; and the invention consists in the construction, arrangement, and combination of parts, all as hereinafter described and claimed.

Reference is to be had to the accompanying drawings, forming a part of this specification, in which similar letters of reference indicate corresponding parts in all the figures.

Figure 1 is a side elevation of my new pipe-coupling. Fig. 2 is a sectional plan view of the same. Fig. 3 is a sectional plan view showing a modification of the coupling-heads. Fig. 4 is a plan view of one coupler, showing a modified form of universal bearing. Fig. 5 is a sectional plan view showing still another modification of the coupling-heads. Fig. 6 is a sectional elevation taken on line $x\ x$ of Fig. 4.

A A represent pillow-blocks by which the couplers may be secured to the bottom of the cars or to the support for the draw-heads. In or to these blocks are fitted universal joints B, each comprising, in this instance, a ball $b$ and conical extension $b'$, which latter acts as a counterpoise to the couplers C, held in the passages $b^2$, made through the said balls and extensions, as shown clearly in Fig. 2. The tubes C' of the couplers enter and pass through said apertures and also through the coiled springs D contained therein, which act against the shoulders $b^3$ at the rear end of the extensions $b'$ and the shoulders $c'$, formed on the tubes, and hold the coupling-heads $c$ firmly together when the cars are backed together and coupled. The coupling-heads $c$ are each enlargements of the tube, and are formed with a seat $c^2$, which in this instance is sloping, to close against and form a steam and air tight joint with the sloping seat of the opposite coupler.

To each head is secured a guide E in the shape of a half-funnel terminating in a way E' to receive and hold the point extensions $c^3$ of the coupling-heads. The ways E' and points $c^3$ serve to bind the coupling-heads together face to face, and thus effect a perfectly air and steam tight joint at the seats $c^2$, which, if desired, may be packed with a soft-rubber or other suitable packing, as shown at $d$, Figs. 3 and 5.

In order to obviate excessive friction, I may fit the channels with rollers F, as shown in Fig. 3, which may be adjusted in or out by adjusting-screws $f$ to press the coupling-heads into close contact with each other, and the outer surfaces of the heads may be slightly rounded to increase the pressure, if desired.

In Fig. 5 I provide each guide with a lever G, formed with inwardly-bent ends $g\ g'$, the former arranged to be acted upon by the beveled end $c^4$ of the point extension $c^3$, which causes the opposite ends of the levers to impinge upon the outer surfaces of the couplers and force them together, as will be clearly understood from Fig. 5.

In place of the ball-joints shown in Figs. 1 and 2, I may use other forms of universal joints—as, for example, an outer annular ring $h$, (shown in Figs. 4 and 6,) in which is pivoted an inner annular ring $h'$, and in which latter is oppositely pivoted the ball $b$ or other form of holder for the coupling-head, so that as with the ball-bearings the couplers are free to move up or down or sidewise to accommodate themselves to any movement of the cars when in motion without strain upon the coupling-heads. When the cars are uncoupled, the couplers are held in alignment by the extensions $b'$ and springs H placed thereon, so that no attention need be paid to them at the time of backing the cars together in making up the train.

In one of the couplers will be fitted a cut-off valve of any suitable form, a slide J, preferably, which is closed by a spring $j$ and opened by the beveled end of the point extension $c^3$, acting to force the valve inward just at the time the couplers completely enter the ways.

The air or steam hose K may be attached to the rear ends of the tubes C', as shown in the drawings, or the coupling-heads may be provided with supplies m, as shown in Fig. 1, to which suitable means may be attached for connecting the hose. When the couplers are connected, the springs D are compressed to such an extent as to allow for the usual separation of the cars due to the length of the link or yielding of any coupler, so that even when the cars are separated to their maximum extent the springs D will still hold the coupling-heads firmly together; and in some cases to assist the springs D or enable comparatively light springs to be used I provide the channels E' with frictional retaining devices to act upon the coupling-heads to hold them in the channels by a force independent of the springs D. These retaining devices are shown in Fig. 2, and consist each of a plate-spring $p$, provided with a beveled point $p'$, which drops through a slot in the channel and enters a small recess in the coupler-head $p^2$.

The spring $H^2$ in Fig. 4, which is a modification of the spring H shown in Figs. 1, 2, and 3, is conical and acts between the annular ring $h$ and the rear end of the coupling-head, and serves the purpose of steadying the coupling-head, and also assists the spring D in holding the coupling-heads together.

Having thus described my invention, I claim as new and desire to secure by Letters Patent—

1. The hollow coupling-heads formed with lateral point extensions and with beveled seats $c^2$, and each provided with a guide or way, in combination with universal bearings attached to the bottom of the cars, and springs fitted in said bearings to press the couplers in contact with each other and springs arranged to normally hold the couplers in line with each other and with the centers of the cars when the cars are uncoupled, substantially as described.

2. The hollow universal bearing weighted at its rear end, in combination with the outer surrounding spring H, inner spring D, and the coupler passed through the hollow universal bearing, substantially as described.

3. The hollow ball $b$ and extension $b'$, held by the pillow-blocks, in combination with the tube of the coupler and the spring D, held in said ball and extension, substantially as described.

JOHN SUYDAM.

Witnesses:
J. L. FOX,
G. L. VAN ALLEN.